US012759121B2

(12) United States Patent
Helstrom et al.

(10) Patent No.: US 12,759,121 B2
(45) Date of Patent: Oct. 13, 2026

(54) TORQUE WRENCH PROFILED CAM LOCK LEVER

(71) Applicant: Snap-on Incorporated, Kenosha, WI (US)

(72) Inventors: Joshua Helstrom, La Habra, CA (US); Jeffrey D. Bergh, Fontana, CA (US); Hanna Feyissa, Yorba Linda, CA (US); Patrick L. Mancini, Corona, CA (US)

(73) Assignee: Snap-on Incorporated, Kenosha, WI (US)

( * ) Notice: Subject to any disclaimer, the term of this patent is extended or adjusted under 35 U.S.C. 154(b) by 292 days.

(21) Appl. No.: 17/990,389

(22) Filed: Nov. 18, 2022

(65) Prior Publication Data

US 2024/0165775 A1 May 23, 2024

(51) Int. Cl.
*B25B 23/142* (2006.01)
*B25G 1/10* (2006.01)

(52) U.S. Cl.
CPC .......... *B25B 23/1427* (2013.01); *B25G 1/105* (2013.01)

(58) Field of Classification Search
CPC . B25B 23/1427; B25B 23/1422; B25B 23/16; B25B 23/141; B25G 1/105
USPC .............................................. 81/478; 403/119
See application file for complete search history.

(56) References Cited

U.S. PATENT DOCUMENTS 2,682,796 A 7/1954 Larson
4,248,107 A 2/1981 Blattner
4,290,329 A * 9/1981 Green ................. B25B 23/1427 81/477
4,485,703 A 12/1984 Grabovac et al.
4,805,464 A 2/1989 Grabovac
5,156,072 A 10/1992 Muralidharan
8,245,606 B2 8/2012 Chiang
(Continued)

FOREIGN PATENT DOCUMENTS

CN 1255421 A 6/2000
TW M568759 U 10/2018
(Continued)

OTHER PUBLICATIONS

Torque-Tech, "Flexible Split-Beam Torque Wrench," tw-torquetech.com; Retrieved on Nov. 18, 2022. URL: https://www.tw-torquetech.com/pro-flexible-split-beam-torque-wrench.html.
(Continued)

*Primary Examiner* — Brian D Keller
*Assistant Examiner* — Jason Khalil Hawkins
(74) *Attorney, Agent, or Firm* — Taft, Stettinius & Hollister LLP

(57) ABSTRACT

A torque wrench with a profiled cam lock lever that is movable between locked and unlocked positions over an adjustment knob of the tool. The lock lever includes an off-center pivot pin and a decreasing radius on a cam profile of the lock lever (rounded corner that contacts a housing of the tool when the lock lever is moved between the locked and unlocked positions). The off-center pivot pin increases an amount of force applied to the adjustment knob when the lock lever is in the locked position to minimize and/or prevent unintentional movement of the adjustment knob. The cam profile reduces an amount of force or effort needed to operate the lock lever and decreases rapid release of the lock lever as over center action is reached.

20 Claims, 8 Drawing Sheets

(56) References Cited

U.S. PATENT DOCUMENTS

| | | | |
|---|---|---|---|
| 9,056,391 B1 | 6/2015 | Wu |
| 10,618,150 B2 | 4/2020 | Reeder et al. |
| 10,688,635 B2 | 6/2020 | Reeder et al. |
| 11,311,989 B2 | 4/2022 | Wu |
| 11,396,091 B2 | 7/2022 | Adams |
| 2016/0031070 A1 | 2/2016 | Ball |
| 2020/0298384 A1 | 9/2020 | Reeder et al. |
| 2021/0260736 A1 | 8/2021 | Lin |
| 2022/0324088 A1 | 10/2022 | Adams |

FOREIGN PATENT DOCUMENTS

| | | |
|---|---|---|
| TW | I643714 B | 12/2018 |
| WO | 2022015282 A1 | 1/2022 |
| WO | 2022140922 A1 | 7/2022 |

OTHER PUBLICATIONS

Tekton, "3/8, 1/2 Inch Drive 72-Tooth Split Beam Torque Wrench Set (2 Piece)," tekton.com; Retrieved on Nov. 18, 2022. URL: https://www.tekton.com/3-8-1-2-inch-drive-split-beam-torque-wrench-set-trq99902.

Harbor Freight, "1/2 In. 40-250ft. lb. Professional Split Beam Torque Wrench," harborfreight.com; Retrieved on Nov. 18, 2022. URL: https://www.harborfreight.com/12-in-40-250-ft-lb-professional-split-beam-torque-wrench-57923.html.

Precision Instruments, "1/2" Drive Split-beam Click Wrench-C3FR250F," torqwrench.com; Retrieved on Nov. 18, 2022. URL: https://www.torqwrench.com/products/split-beam-clicks/1-2-drive-split-beam-click-wrench-c3fr250f/.

Olsatools, "Split Beam Torque Wrench 1/2" Drive (50-250 ft-lb Torque Range)—+4% Accuracy," olsatools.com; Retrieved on Nov. 18, 2022. URL: https://olsatools.com/products/split-beam-torque-wrench.

Mac Tools, "1/2: Drive Split-Beam Torque Wrench 40-250 Ft.Lbs.," mactools.com; Retrieved on Nov. 18, 2022. URL: https://www.mactools.com/products/twv250p.

Matco Tools, "1/2" Drive 72 Tooth Split Beam 250 Ft. Lbs. Flex Head Torque Wrench," matcotools.com; Retrieved on Nov. 18, 2022. URL: https://www.matcotools.com/catalog/product/TSBC250F72/1-2-DRIVE-72-TOOTH-SPLIT-BEAM-250-FT-LBS-FLEX-HEAD-TORQUE-WRENCH/.

Cornwell Quality Tools, "PRIC2FR50F—3/8" Drive Flex Head Split Beam Torque Wrench," cornwelltools.com; Retrieved on Nov. 18, 2022. URL: https://webcat.cornwelltools.com/PRIC2FR50F-3-8-Drive-Flex-Head-Split-Beam-Torque-Wrench-p371690740.

UK Intellectual Property Office, Examination Report issued in corresponding Application No. GB2316247.2, dated Apr. 24, 2024, 8 pp.

Australian Patent Office, Examination Report No. 2 issued in corresponding Application No. 2023258407, dated Sep. 10, 2025, 3 pp.

Canadian Patent Office, Examination Report issued in corresponding Application No. 3,218,325, dated Feb. 14, 2025, 4 pp.

Australian Patent Office, Examination Report No. 1 issued in corresponding Application No. 2023258407, dated Oct. 16, 2024, 3 pp.

Chinese Patent Office, First Office Action issued in corresponding Application No. 202311535882.7, dated Apr. 9, 2026, 11 pp.

* cited by examiner

TORQUE WRENCH PROFILED CAM LOCK LEVER

TECHNICAL FIELD OF THE INVENTION

The present invention relates generally to torque wrenches, and more particularly to lock levers for locking a torque setting of torque wrenches.

BACKGROUND OF THE INVENTION

Torque application type tools, such as torque wrenches, are commonly used in the automotive industry to secure components together by tightening fasteners, such as lug nuts and suspension bolts, for example, to a desired force or torque or within a desired torque range. Securing a fastener at a desired torque allows for secure attachment of the components and any structures related thereto without under-tightening or over-tightening the fastener. Under-tightening the fastener could result in disengagement of components. Over-tightening the fastener could make disengaging the components difficult or could cause damage to the components. To prevent under-tightening or over-tightening a torque measurement can be made while tightening the components, for example, a nut to a bolt, to meet a torque setting or to apply a torque within a desired torque range.

Some torque wrenches, such as described in U.S. Pat. No. 4,290,329, include a dial that is usable to set a desired torque setting, and a spring and lever that can be used hold the dial at the desired torque setting. However, these torque wrenches generally have a fixed pivot point on the lever that requires significant force to operate the lever, and rapidly releases spring tension through the lever when the lever is moved from a locked to an unlocked position. For example, a shape of the lever applies maximum tension through the spring when the lever is moved to about halfway between the unlocked and locked positions. Due to the maximum tension through the spring being achieved when the lever is halfway between the unlocked and locked positions, the lever tends to flip over rapidly (for example, to the unlocked position). This can cause a sharp impact to a hand or fingers of a user when moving the lever to the unlocked position to adjust the dial (i.e. torque setting). These torque wrenches also tend to provide insufficient spring tension when the lever is closed or in the locked position. For example, when the lever is in the locked position, the spring is under tension to attempt to hold the dial in position (i.e., hold the torque setting). However, this tension is insufficient to prevent the dial from moving with repeated applications of torque. This allows the dial to move and change the torque setting undesirably during repeated use of the torque wrench.

SUMMARY OF THE INVENTION

The present invention relates broadly to a tool, such as a split beam style torque wrench, with a profiled cam lock lever that can be moved between locked (closed) and unlocked (open) positions over an adjustment knob of the tool. In the locked position, the lock lever serves to maintain a dial setting (also referred to as a torque setting) of the tool through spring tension of a bias member applied to the adjustment knob. In the unlocked position, the adjustment knob is rotatable to adjust or set the tool to a desired torque setting. The lock lever includes an off-center pivot pin and a decreasing radius on a cam profile of the lock lever (rounded corner that contacts a housing of the tool when the lock lever is moved between the locked and unlocked positions). The off-center pivot pin increases a distance an end of the bias member is deflected when the locking lever is in the locked position, and thereby increases an amount of force applied to the adjustment knob (compared to prior tools). By ensuring sufficient spring tension is applied in the locked position, unintentional dial setting (i.e., torque setting) changes during use of the tool are minimized and/or prevented.

The cam profile reduces an amount of force or effort needed to operate the lock lever (compared to prior tools), while also ensuring that sufficient spring tension is applied to the adjustment knob when the lock lever is in the locked position. The cam profile also decreases rapid release of the lock lever as over center action is reached, decreasing the potential energy and/or release velocity of the lock lever to snap or impact a hand or fingers of a user when moved to the unlocked position. The cam profile provides smoother operation and increases the lifespan of the tool by increasing the surface area in contact between the lock lever and housing portion throughout a range of motion of the lock lever.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
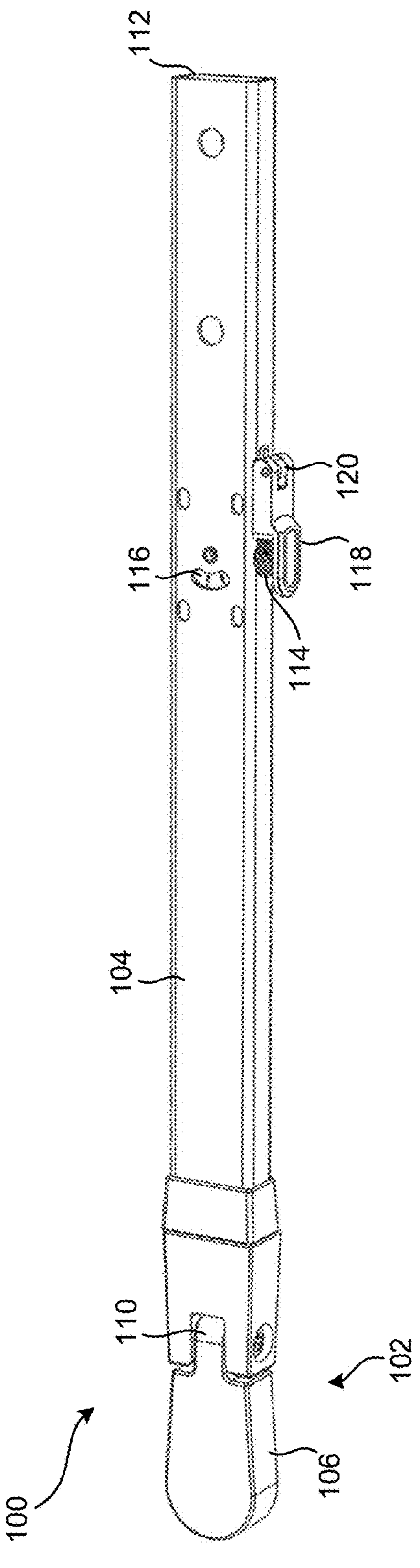
FIG. 1 is a first perspective view of a tool, according to an embodiment of the present invention.

While the present invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a tool, such as a split beam style torque wrench, with a profiled cam lock lever that can be moved between locked (closed) and unlocked (open) positions over an adjustment knob of the tool. In the locked position, the lock lever serves to maintain a dial setting (also referred to as a torque setting) of the tool through spring tension of a bias member applied to the adjustment knob. In the unlocked position, the adjustment knob is rotatable to adjust or set the tool to a desired torque setting. The lock lever includes an off-center pivot pin and a decreasing radius on a cam profile of the lock lever (rounded corner that contacts a housing of the tool when the lock lever is moved between the locked and unlocked positions). The off-center pivot pin increases a distance an end of the bias member is deflected when the locking lever is in the locked position, and thereby increases an amount of force applied to the adjustment knob (compared to prior tools). By ensuring sufficient spring tension is applied in the locked position, unintentional dial setting (i.e., torque setting) changes during use of the tool are minimized and/or prevented.

The cam profile reduces an amount of force or effort needed to operate the lock lever (compared to prior tools), while also ensuring that sufficient spring tension is applied to the adjustment knob when the lock lever is in the locked position. The cam profile also decreases rapid release of the lock lever as over center action is reached, decreasing the potential energy and/or release velocity of the lock lever to snap or impact a hand or fingers of a user when moved to the unlocked position. The cam profile provides smoother operation and increases the lifespan of the tool by increasing the surface area in contact between the lock lever and housing portion throughout a range of motion of the lock lever.

Figure 2:
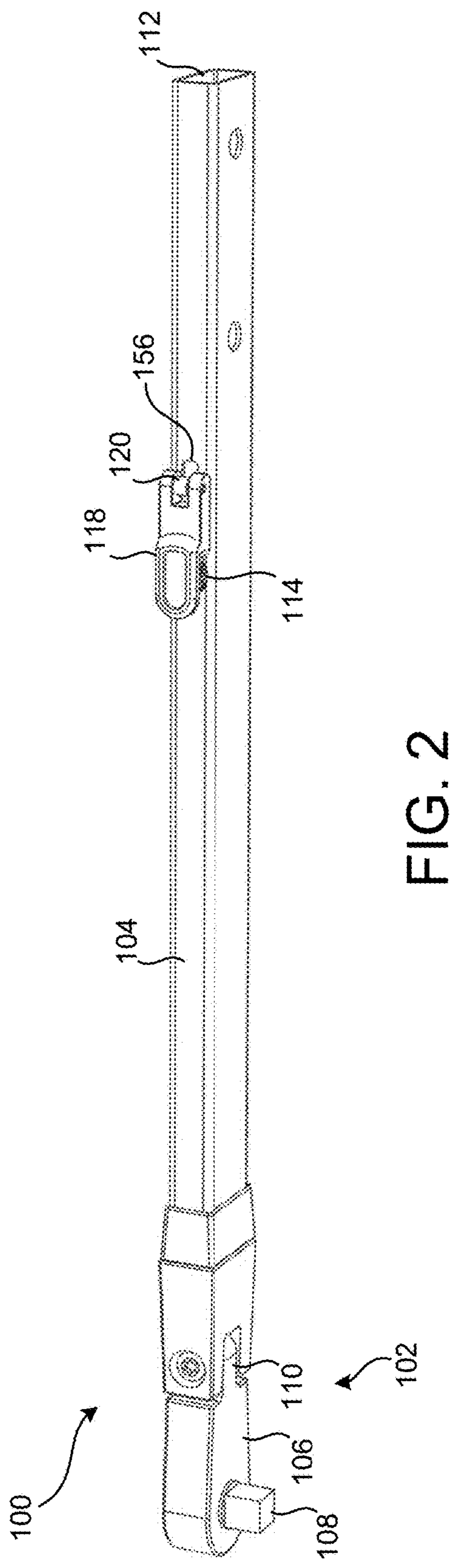
FIG. 2 is a second perspective view of the tool of FIG. 1, according to an embodiment of the present invention.

Referring to FIGS. 1 and 2, a tool 100, such as a split beam style torque wrench, is illustrated. The tool 100 includes a head portion 102 and a handle portion 104 coupled to the head portion 102. The head portion 102 may be a ratchet type head including a ratchet head 106 with a drive lug 108. The drive lug 108 is adapted to apply torque to a work piece, such as a fastener, via an adapter, bit, or socket coupled to the drive lug 108, such as a ratcheting square or hexagonal drive. As illustrated, the drive lug 108 is a "male" connector designed to fit into or matingly engage a female counterpart. However, the drive lug 108 may alternatively include a "female" connector designed to matingly engage a male counterpart. The drive lug 108 may also be structured to directly engage a work piece without requiring coupling to an adapter, bit, or socket.

In some embodiments, the ratchet head 106 may be pivotable with respect to the handle portion 104. For example, the head portion 102 may include a pivotable connection 110 that allows the ratchet head 106 to be oriented a varying angles with respect to the handle portion 104 to allow the tool 100 to fit in hard to reach places.

The handle portion 104 may be a tubular type member that houses internal components of the tool 100 (as described in further detail below), and may be made of metal or other suitable material. The handle portion 104 may include a cap closing an end of the handle portion 104 opposite the head portion. Alternatively, the handle portion 104 may include an end aperture 112 at the end of the handle portion 104 opposite the head portion, and that is adapted to receive an accessory, such as a breaker bar or other type of accessory, for example.

The tool 100 also includes a torque setting mechanism with an adjustment knob 114 (as described in further detail below). The adjustment knob 114 is rotatable in either of first and second rotational directions (such as, clockwise or counterclockwise) by a user to a desired dial setting or torque setting that is readable via a torque setting indicator 116. The torque setting indicator 116 is operably coupled to the adjustment knob 114 and visible through an opening in the handle portion 104, such that as the user rotates the adjustment knob 114, the torque setting indicator 116 moves a scale that includes torque value markings. Thus, to set a torque setting of 100 ft-lb, for example, the user rotates the adjustment knob 114 to cause the torque value marking that indicates 100 ft-lb of the torque setting indicator 116 to align with an indicator (line or arrow).

The tool 100 also includes a lock lever 118 that is movable between locked (closed) and unlocked (open) positions over the adjustment knob 114. In the locked position, the lock lever 118 serves to maintain a dial setting (also referred to as a torque setting) of the tool 100 through spring tension applied to the adjustment knob 114 by a bias member 120. In the unlocked position, the adjustment knob 114 is rotatable to adjust or set the tool 100 to a desired torque setting.

The lock lever 118 includes an off-center pivot pin and a decreasing radius on a cam profile of the lock lever 118 (described in further detail below). The off-center pivot pin increases a distance an end of the bias member 120 is deflected when the locking lever 118 is in the locked position, and thereby increases an amount of force applied to the adjustment knob. This ensures sufficient spring tension or force is applied to the adjustment knob 114 when the lock lever 118 is in the locked position to minimize and/or prevent unintentional dial setting (i.e., torque setting) changes during use of the tool. The cam profile reduces an amount of force or effort needed to operate the lock lever 118, while also ensuring that sufficient spring tension or force is applied to the adjustment knob 114 when the lock lever 118 is in the locked position. The cam profile decreases rapid release of the lock lever 118 as over center action is reached, decreasing the potential energy and/or release velocity of the lock lever 118 to snap or impact a hand or fingers of a user when moved to the unlocked position. The cam profile also provides smoother operation and increases the lifespan of the tool 100 by increasing the surface area in contact between the lock lever 118 and housing portion 104 throughout a range of motion of the lock lever 118.

Figure 3:
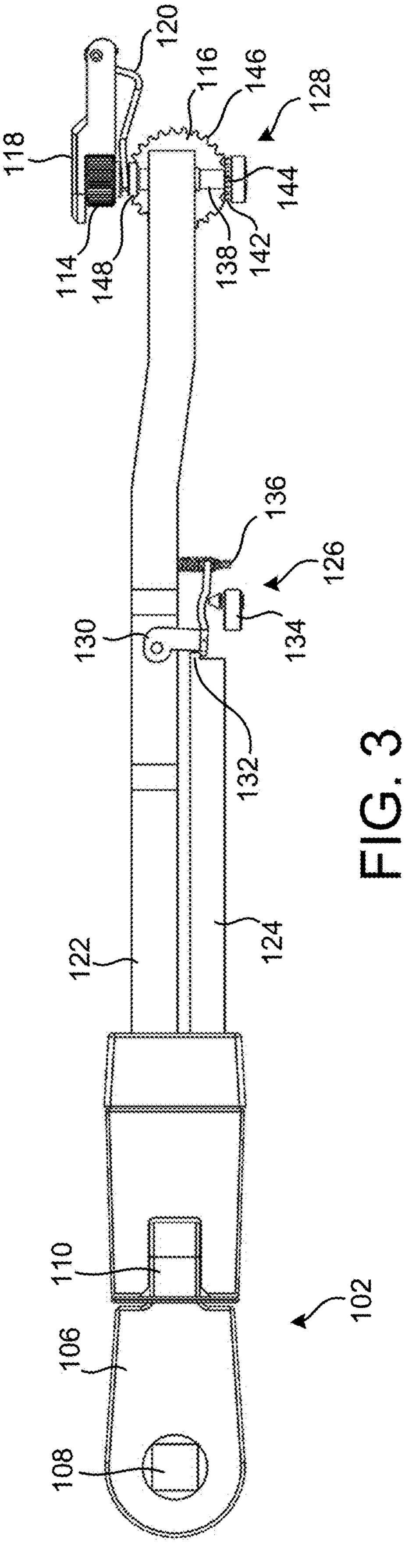
FIG. 3 is a view of internal components of the tool with a housing portion of the tool removed, according to an embodiment of the present invention.
Figure 4:
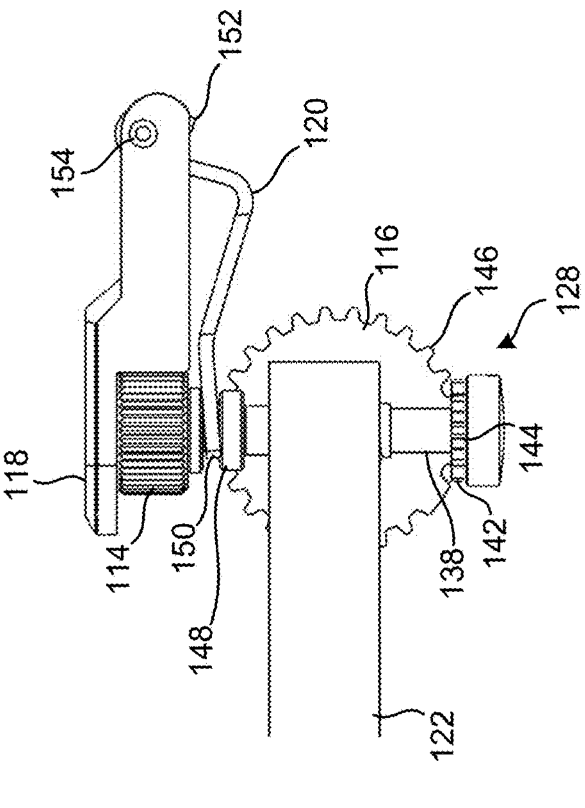
FIG. 4 is an enlarged view of an adjustment mechanism and lock lever of the tool, according to an embodiment of the present invention.
Figure 6:
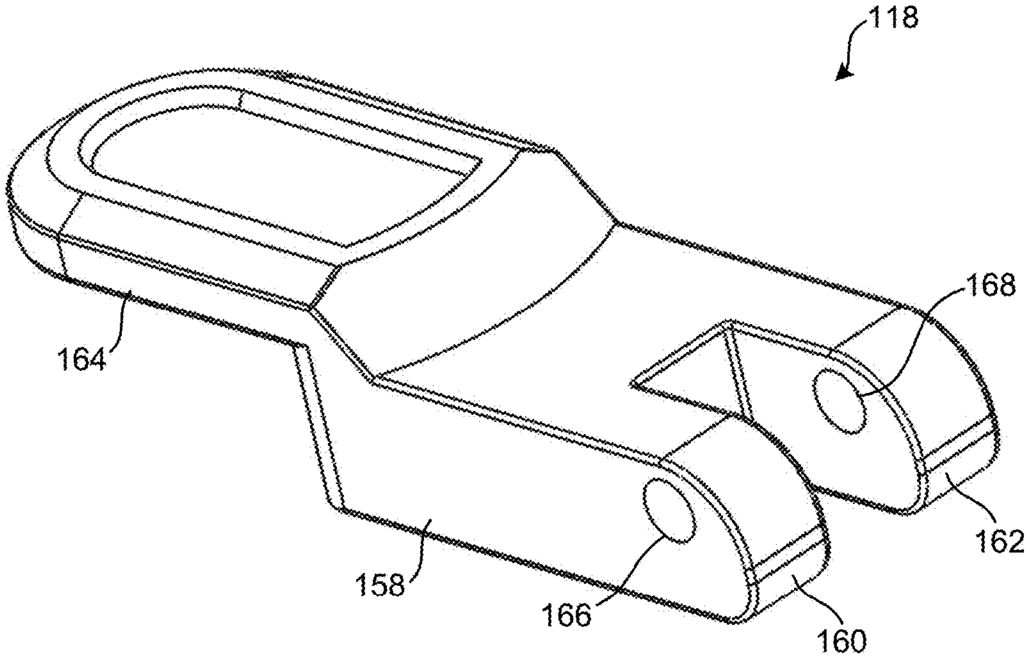
FIGS. 6-9 are views of the lock lever, according to an embodiment of the present invention.

Referring to FIGS. 3 and 4, the tool 100 may be a split beam style torque wrench, and the internal components of the tool 100 may include first and second beams 122, 124, a torque release mechanism 126, and a torque setting mechanism 128. The first beam 122 is longer than the second beam 124, and is operably coupled to the torque setting mechanism 128. The second beam 124 is releasably coupled to the first beam 122 via the torque release mechanism 126. The torque release mechanism 126 includes a release trigger 130 pivotably coupled to the first beam 122 and releasably coupled to a protrusion 132 at an end of the second beam 124, and a stop 134 (also referred to as a calibration screw). The torque release mechanism 126 also includes a bias member, such as a spring 136. The spring 136 is disposed between the first beam 122 and a projecting portion of the release trigger 130, and biases the release trigger 130 into engagement with the protrusion 132 at the end of the second beam 124. The stop 134 is coupled to the housing portion, and adapted to contact the release trigger 130 when the desired torque setting is reached.

For example, during application of torque by the tool 100, the first and second beams 122, 124 flex. As an increased amount of torque is applied, the first and second beams 122, 124 further flex until the release trigger 130 contacts the stop 134. When the release trigger 130 contacts the stop 134, the protrusion 132 at the end of the second beam 124 disengages from the release trigger 130 to indicate that the amount of torque applied by the tool 100 meets the torque setting (set by the user via the adjustment knob 114). When the protrusion 132 at the end of the second beam 124 disengages from the release trigger 130, a rapid release of stored energy occurs, and the end of the second beam 124 impacts against an interior side wall of the handle portion 104. This impact causes an audible clicking sound and physical impulse through the handle portion 104. The impulse and audible clicking sound provides an indication to or alerts the user that the amount of torque applied by the tool 100 meets the torque setting. When application of torque by the tool 100 is released, the torque release mechanism 126 resets to allow the tool 100 to be used in another torquing operation.

The impact and physical impulse through the handle portion 104 is generally what causes the torque setting in the prior tools, such as the tool described in U.S. Pat. No. 4,290,329 (the '329 Patent), to unintentionally change. For example, in the tool described in U.S. Pat. No. 4,290,329, the impact and physical impulse can cause the spring 55 of the '329 Patent to temporarily lose tension on the adjusting knob 43 of the '329 Patent, which can allow the adjusting knob 43 of the '329 Patent to move and cause minor changes in the torque setting. This is known as "drift, and can lead to torquing fasteners in a subsequent torquing operation to an unsuitable and/or undesired torque value, unless the user readjusts the torque setting between torquing operations.

Referring again to FIGS. 3 and 4, the torque setting mechanism 128 is operable by the user via the adjustment knob 114 to set the torque setting of the tool 100 (i.e., the amount of torque that causes the second beam 124 to disengage from the release trigger 130). As illustrated in FIGS. 3 and 4, the torque setting mechanism 128 includes the adjustment knob 114, a shaft 138, and the torque setting indicator 116. The shaft 138 is coupled to and extends from the adjustment knob 114 between opposite sides of the handle portion 104, and includes a screw type gear 140 (shown in FIGS. 10, 12, and 13) that mates with a corresponding threaded aperture in an end of the first beam 122. The shaft 138 also includes a gear 142 with gear teeth 144 that meshingly engage teeth 146 of the torque setting indicator 116 (which may also be referred to as a torque gear). The torque setting indicator 116 may be coupled or journaled to a wall of the handle portion 104 to hold the torque setting indicator 116 in position and allow for rotation of the torque setting indicator 116.

As the adjustment knob 114 is rotated, the shaft 138 is also rotated. As the shaft 138 is rotated, the screw type gear 140 causes the end of the first beam 122 to be moved along the screw type gear 140, and the gear 142 causes the torque setting indicator 116 to rotate. This allows the torque setting of the tool 100 to be adjusted and set by the user via rotation of the adjustment knob 114.

Referring to FIGS. 3 and 4, the shaft 138 may also include a flange 148 proximal to the adjustment knob 114, but spaced from the adjustment knob 114 to provide a gap adapted to receive and end of the bias member 120. Referring to FIG. 4, the lock lever 118 and bias member 120 cooperate with one another to form a locking mechanism of the tool 100 that is adapted to hold or otherwise prevent unintentional rotation of the adjustment knob 114 (an thereby unintentional changing of the torque setting).

Figure 5:
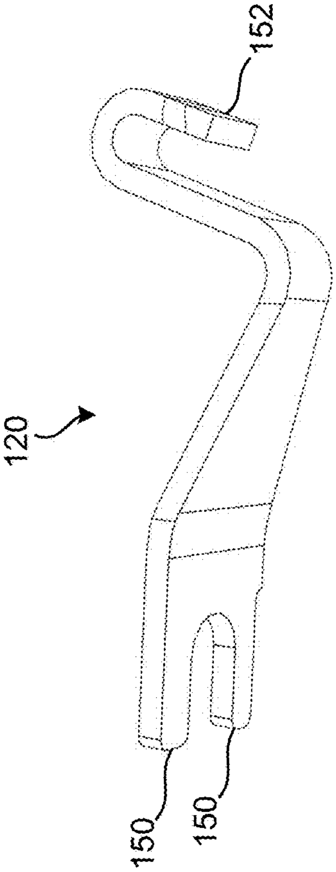
FIG. 5 is an enlarged perspective view of a bias member of the tool, according to an embodiment of the present invention.

Referring to FIGS. 4 and 5, the bias member 120 may be in the form of a flat type spring that has opposing first and second ends 150, 152. The first end 150 is disposed on the shaft 138 between the flange 148 and the adjustment knob 114, within the handle portion 104 of the tool. In this regard, the first end 150 of the bias member 120 may be bifurcated to form a notch that receives the shaft 138. The second end 152 of the bias member 120 is curved to provide a hook type end that engages or hooks onto a pivot pin 154 coupled to the lock lever 118 to pivotally couple the lock lever 118 to the tool 100. In this regard, the handle portion 104 may include an aperture 156 (shown in FIGS. 2 and 10-14) that the second end 152 of the bias member 120 passes through out of the handle portion 102 and into engagement with the pivot pin 154. The bias member 120 may also include one or more bends between the first and second ends 150, 152 to provide a higher bias force to the adjustment knob 114 when the lock lever 118 is in the locked position, and a lower bias force to the adjustment knob 114 when the lock lever 118 is in the unlocked position.

Referring to FIGS. 6-9, the lock lever 118 may have a shape that allows for locking and covering the adjustment knob 114. As illustrated, the lock lever 118 includes a base portion 158, with first and second arms 160, 162 proximal to a first end, and a cap portion 164 proximal to a second end. The cap portion 164 may be shaped to allow the base portion 158 of the lock lever 118 to be disposed proximal to the adjustment knob 114 and the cap portion 164 to cover a top portion of the adjustment knob 114, when the lock lever 118 is disposed in the locked position.

The first and second arms 160, 162 may include first and second apertures 166, 168, respectively, that are axially aligned with each other, and adapted to receive the pivot pin 154. The first and second apertures 166, 168 may be positioned off-center with respect to radii of the cam profile. This places the pivot pin 154 off-center with respect to the cam profile 170 (described in further detail below). For example, a center of the first and second apertures 166, 168 and/or pivot pin 154 may be positioned a distance $D_{PIVOT}$ above a bottom surface of the lock lever 118. In one example, the pivot pin 154 is a ⅛ inch diameter pin, with a thickness of about 0.31 inches, and the distance $D_{PIVOT}$ is about 0.17 inches to about 0.23 inches (including all subranges and values therebetween), and more particularly about 0.21 inches.

The off-center position of the pivot pin 154 causes the second end 152 of the bias member 120 to be deflected a greater distance out of the handle portion 104 when the locking lever 118 is in the locked position, and thereby increases an amount of force applied to the adjustment knob 114 (compared to prior tools, such as the tool described in the '329 Patent mentioned above). This ensures sufficient bias force is applied to the adjustment knob 114 when the lock lever 118 is in the locked position to minimize and/or prevent unintentional dial setting (i.e., torque setting). While the pivot pin 154 is described as being disposed in the first and second apertures 166, 168, alternatively, the pivot pin 154 may be integrally formed with the lock lever 118.

Figure 7:
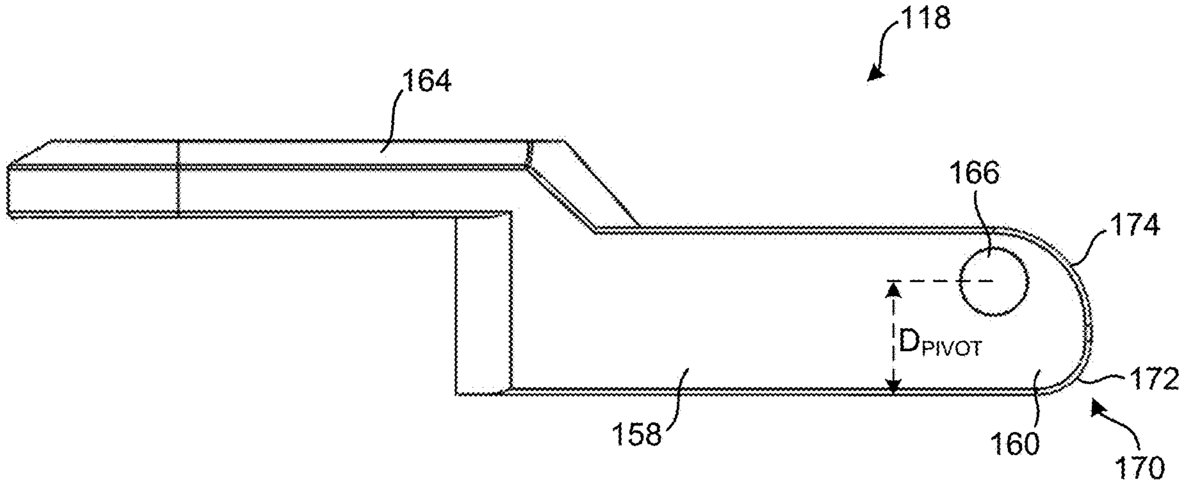
Figure 8:
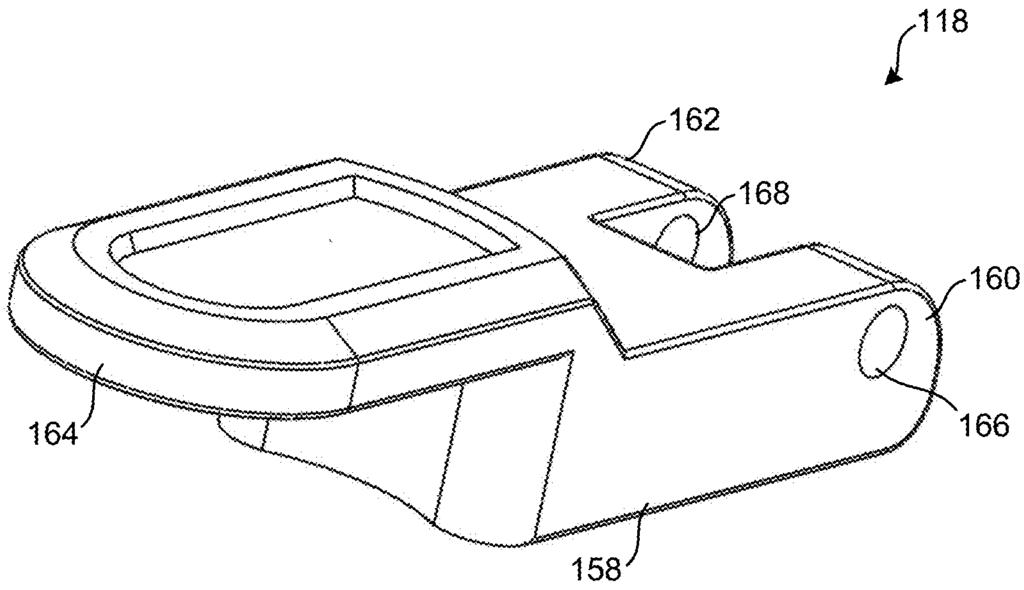
Figure 9:
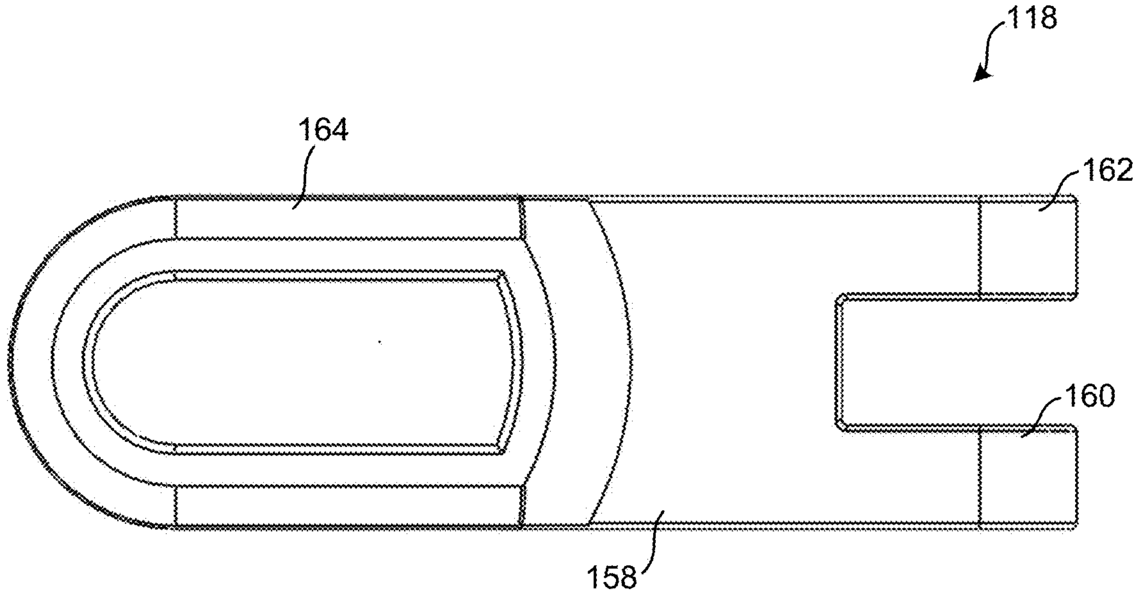

Referring to FIG. 7, each of the first and second arms 160, 162 includes a cam profile 170, such as one or more rounded corners that are adapted to contact an external surface of the housing portion 104 when the lock lever 118 is moved between the locked and unlocked positions. The cam profile 170 may include a decreasing radius to reduce an amount of force or effort needed to operate the lock lever 118, while also ensuring that sufficient bias force is applied to the adjustment knob 114 by the bias member 120 when the lock lever 118 is in the locked position. By ensuring sufficient bias force is applied in the locked position, unintentional torque or dial setting changes during use of the tool 100 are minimized and/or prevented. The cam profile 170 also decreases rapid release of the lock lever 170 as over center action is reached, slowing down a release of energy of the bias member 120, and decreasing the potential of the lock lever 118 to snap or impact a hand or fingers of a user when the lock lever 118 is moved to the unlocked position.

In an example, the cam profile 170 may include first and second radiused portions 172, 174. The first radiused portion 172 forms a first rounded corner that is disposed proximal to the housing portion 104 when the lock lever 118 is in the locked position. The second radiused portion 174 forms a second rounded corner that is disposed proximal to the housing portion 104 when the lock lever 118 is in the unlocked position. The cam profile 170 promotes rolling friction between the lock lever 118 and the handle portion 104 which can extend the life of the tool 100 and reduce wear on the exterior surface of handle portion 104. The cam profile 170 also provides for a slower release of energy from the bias member 120 when the lock lever 118 is moved from the locked position to the unlocked position. The rolling action of the cam profile 170 reduces the potential for an instantaneous release of energy, instead gradually decreasing spring tension as the lock lever 118 is moved from the locked position to the unlocked position. This reduces the potential impact speed of the lock lever 118 against a hand and fingers of a user as the lock lever 118 is moved to the unlocked position to adjust the torque setting.

In one example, the first radiused portion 172 has a curvature/radius of about 0.08 inches to about 0.18 inches (including all subranges and values therebetween), and preferably has a curvature/radius of about 0.1 inches to about 0.12 inches (including all subranges and values therebetween); and the second radiused portion 174 has a curvature/radius of about 0.15 inches to about 0.2 inches (including all subranges and values therebetween), and preferably has a curvature/radius of about 0.18 inches.

Figure 10:
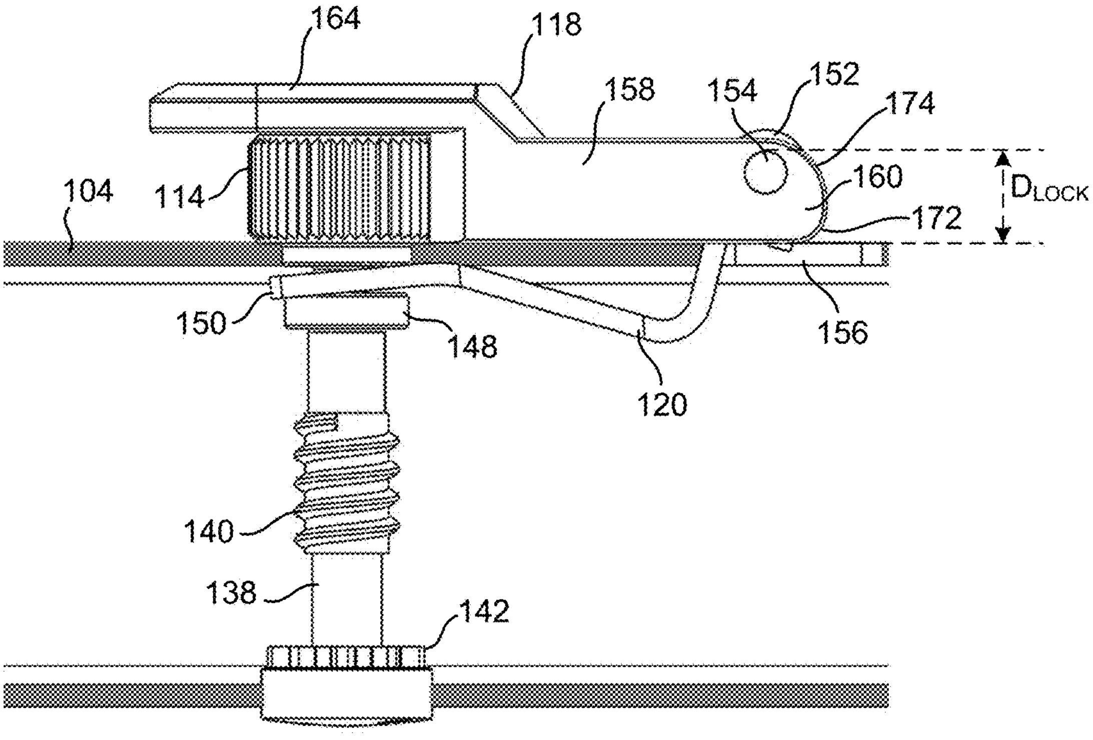
FIGS. 10 and 11 are views of the lock lever in a locked position, according to an embodiment of the present invention.
Figure 11:
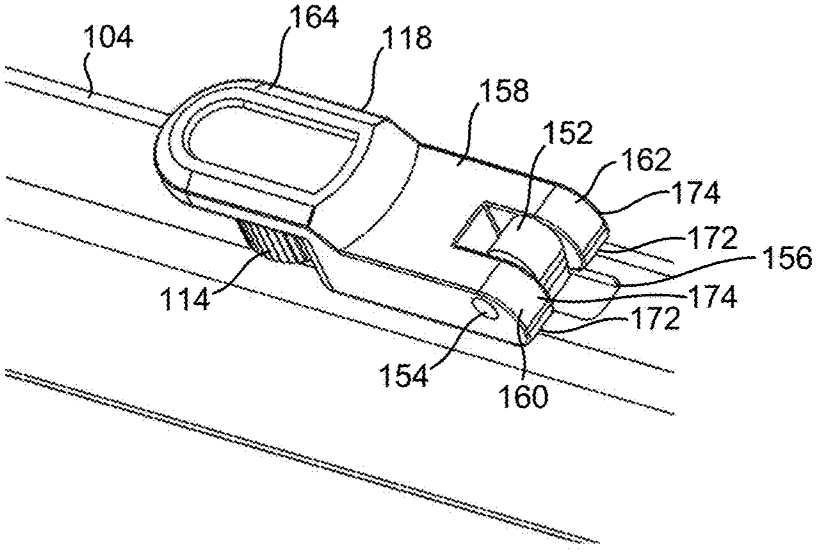

Referring to FIGS. 10 and 11, the lock lever 118 is shown disposed in the locked position. In the locked position, the first radiused portion 172 is disposed proximal to the housing portion 104, the base portion 158 abuts the housing portion 104 and is disposed proximal to the adjustment knob 114, and the cap portion 164 at least partially covers a top portion of the adjustment knob 114. Additionally, the off-center nature of the pivot pin 154 causes the second end 152 of the bias member 150 to be pulled a distance $D_{LOCK}$ above the exterior surface of the housing portion 104.

In the locked position, the first end 150 of the bias member 120 exerts a first bias force (due to a potential energy of the bias member 120) on the flange 148 in a first direction away from the adjustment knob 114, and the lock lever 118/pivot pin 154 causes a second bias force to be exerted on the second end 152 of the bias member 120 in a second direction opposite the first direction. In the locked position, the adjustment knob 114 is locked or retained in position by frictional engagement with the exterior surface of the handle portion 104 and/or frictional engagement with an inwardly facing surface of the cap potion 164 of the lock lever 118.

In an example, when the lock lever 118 is in the locked position, the distance $D_{LOCK}$ is about 0.2 inches to about 0.35 inches (including all subranges and values therebetween), and more particularly about 0.273 inches. When the distance $D_{LOCK}$ is about 0.273 inches, the second bias force may be about 92.1 lbs of force, which causes the potential energy of the bias member 120 to be about 12.6 lb-in of potential energy. The 12.6 lb-in of potential energy causes a corresponding bias force (i.e., the first bias force) to be exerted on the adjustment knob 114 to prevent the adjustment knob 114 from moving unintentionally during use of the tool 100. The 12.6 lb-in of potential energy is an increase of about 162% compared to the tool of the '329 Patent, and the 92.1 lbs of force is an increase of about 62% compared to the tool of the '329 Patent.

The lock lever 118 is movable from the locked position to the unlocked position by a user lifting the cap portion 164 away from the adjustment knob 114. The cam profile 170 of the lock lever 118 reduces the amount of effort or force required by a user to move the lock lever 118 between the locked and unlocked positions, compared to prior tools. For example, the radii of the cam profile 170 maintain the motion of the lock lever 118 as rolling friction against the handle portion 104 and reduce sliding friction. This rolling friction and increase in surface area contact between the lock lever 118 and handle portion 104 reduces the velocity of the lock lever 118 as the lock lever 118 is moved or flipped from the unlocked position to the locked position, and vice versa. The cam profile 170 therefore provides a slower, controlled release of the stored potential energy in the bias member 120 and minimizes the potential for the lock lever 118 to snap open into the unlocked position, potentially pinching a hand or fingers of the user.

Additionally, when the lock lever 118 is moved from the unlocked position to the locked position, the radii of the cam profile 170, which continuously decrease, allow the amount of force required to move the lock lever 118 to remain more constant as the bias member 120 is deflected further, increasing the mechanical advantage of the lock lever 118 until the lock lever 118 reaches the locked position with a positive stop.

Figure 12:
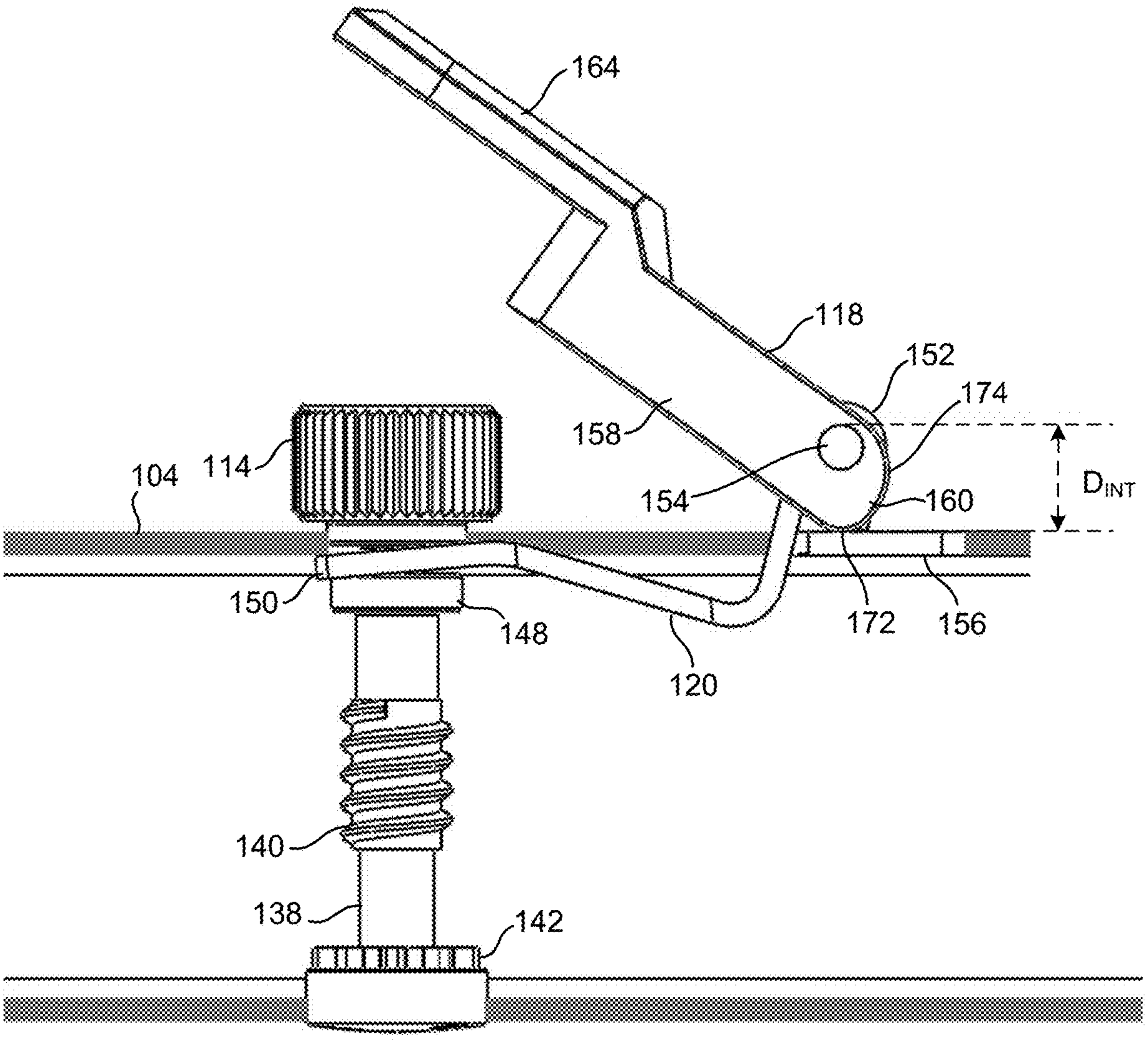
FIG. 12 is a view of the lock lever in an intermediate position, according to an embodiment of the present invention.

As the lock lever 118 is moved from the locked position to the unlocked position, and vice versa, the lock lever 118 travels through an intermediate position illustrated in FIG. 12. In the intermediate position, the lock lever 118 is angularly disposed about 140° from the unlocked position (or about 40° from the locked position), and the first radiused portion 172 contacts and cams against the exterior surface of the housing portion 104. Additionally, the off-center nature of the pivot pin 154 causes the second end 152 of the bias member 150 to be pulled a distance DINT above the exterior surface of the housing portion 104. The first end 150 of the bias member 120 exerts a third bias force (due to a potential energy of the bias member 120) on the flange 148 in the first direction away from the adjustment knob 114, and the lock lever 118/pivot pin 154 causes a fourth bias force to be exerted on the second end 152 of the bias member 120 in the second direction opposite the first direction.

Again, the cam profile of the first radiused portion 172 decreases potential rapid release of the lock lever 118 as over center action is reached, thereby decreasing the potential energy and/or release velocity of the lock lever 118 to snap into the unlocked position and snap, impact, or pinch a hand or fingers of a user when the lock lever 118 is moved to the unlocked position. The cam profile of the first radiused portion 172 also provides smoother operation and increases the lifespan of the tool 100.

In an example, when the lock lever 118 is in the intermediate position, the distance DINT is about 0.22 inches to about 0.37 inches (including all subranges and values therebetween), and more particularly about 0.299 inches. When the distance DINT is about 0.299 inches, the fourth bias force may be about 100.9 lbs of force, which causes the potential energy of the bias member 120 to be about 15.1 lb-in of potential energy. The 100.9 lbs of force is an increase of about 3% compared to the tool of the '329 Patent.

Figure 13:
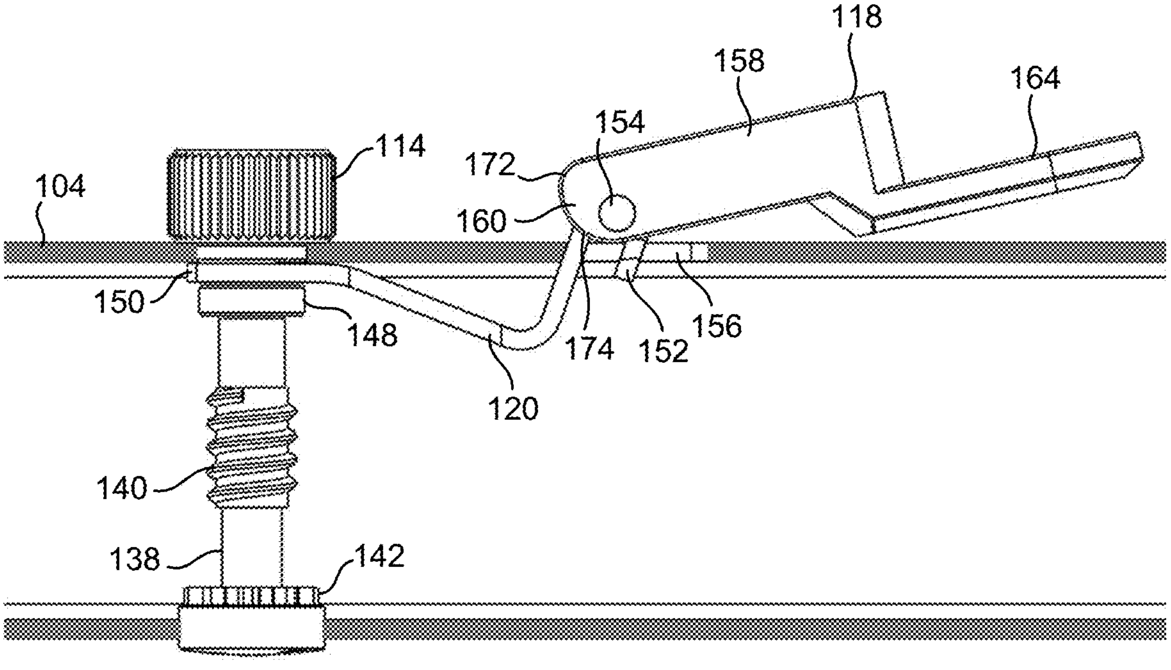
FIGS. 13 and 14 are views of the lock lever in an unlocked position, according to an embodiment of the present invention.
Figure 14:
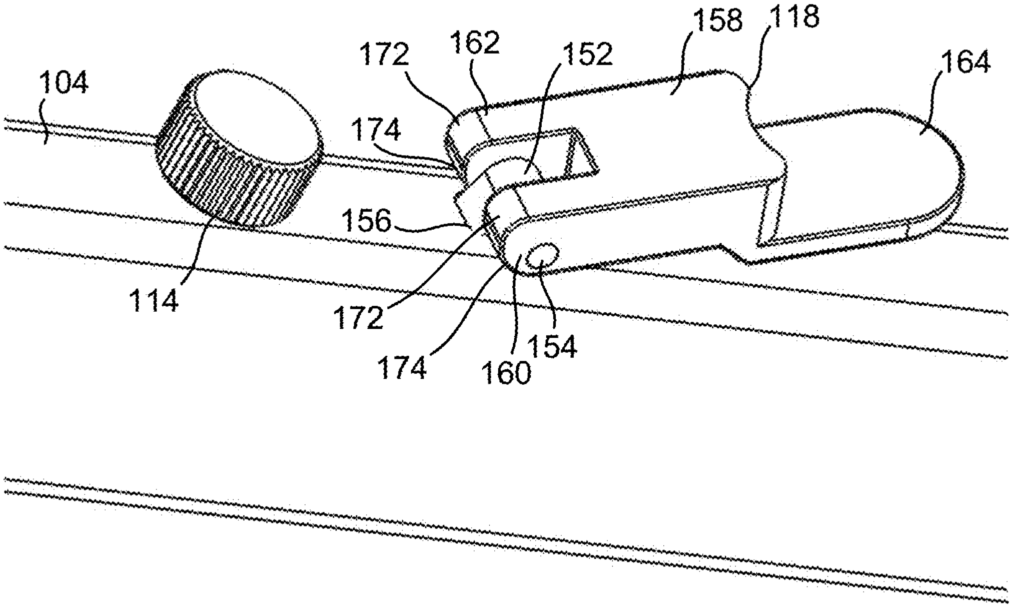

Referring to FIGS. 13 and 14, the lock lever 118 is shown disposed in the unlocked position. In the unlocked position, the second radiused portion 174 is disposed proximal to the housing portion 104, and the cap portion 164 is disposed away from the adjustment knob 114. Additionally, in the unlocked position, the first end 150 of the bias member 120 exerts a first minimum bias force on the flange 148 in the first direction away from the adjustment knob 114, and the engagement between the pivot pin 154 disposed in the lock lever 118 and the second end 152 of the bias member 120 causes a second minimum bias force to be exerted in the second direction opposite the first direction. In the unlocked position, the adjustment knob 114 is rotatable by the user to allow the user to adjust or otherwise change the torque setting of the tool 100.

In an example, when the lock lever 118 is in the unlocked position, the second minimum bias force may be about 0 lbs of force to about 5 lbs of force (including all subranges and values therebetween), and more particularly substantially zero lbs of force, which causes the first minimum bias force to be about 0 lbs of force to about 3 lbs of force (including all subranges and values therebetween), and more particularly substantially zero lbs of force on the adjustment knob 114 to allow the user to rotate the adjustment knob 114 and adjust or otherwise change the torque setting of the tool 100.

Figure 15:
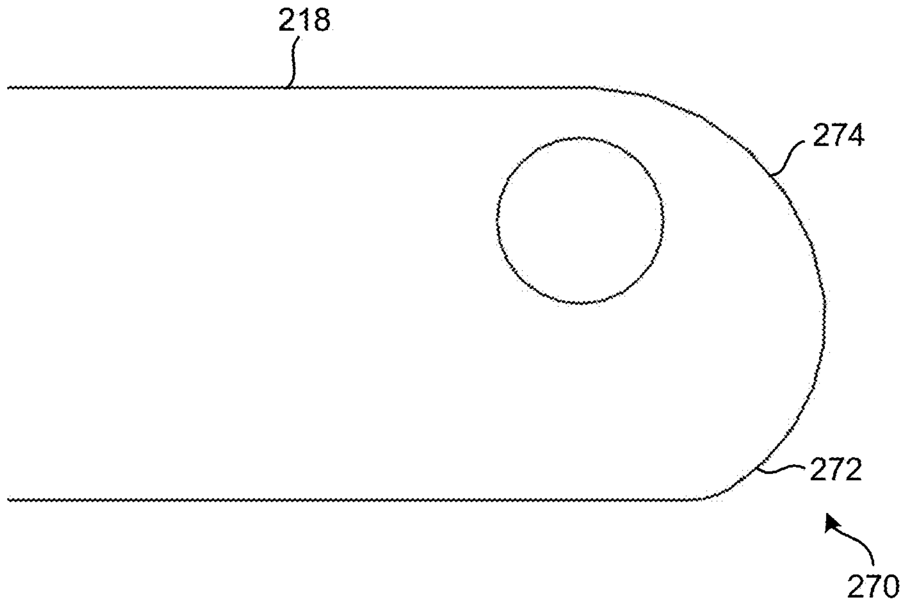
FIG. 15 is a partial side view of a cam profile of a lock lever, according to another embodiment of the present invention.
Figure 16:
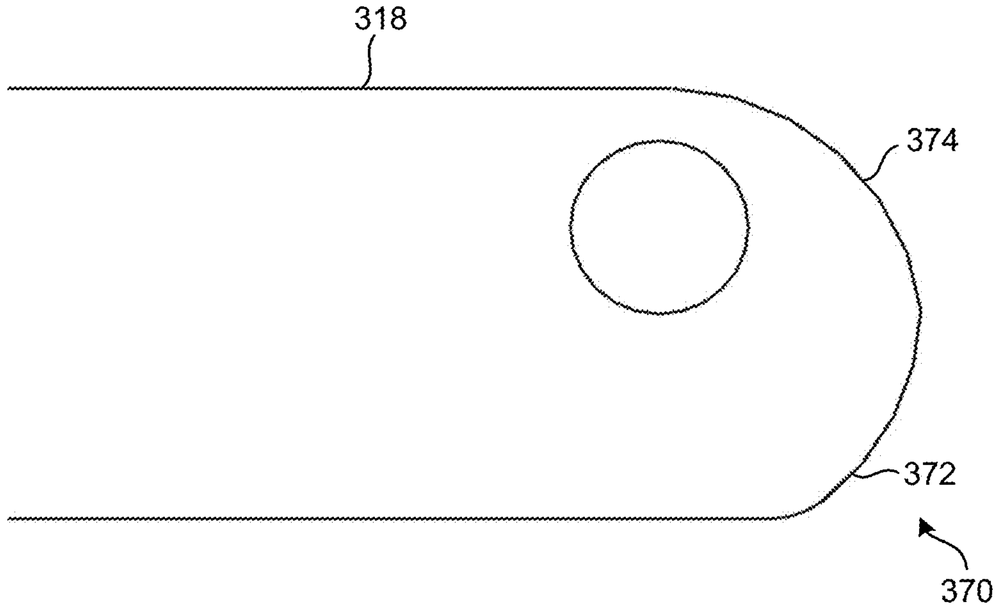
FIG. 16 is a partial side view of a cam profile of a lock lever, according to another embodiment of the present invention.

While the cam profile of the lock lever is described as being the cam profile 170, it should be appreciated that the cam profile can include any radius or combination of radii to provide sufficient action when moving the lock lever between the locked and unlocked positions to decrease user effort and increase service life of the lock lever and/or tool. For example, referring to FIG. 15, the lock lever can be a lock lever 218, similar to lock lever 118, that has a cam profile 270 with first and second radiused portions 272, 274. In this example, the first radiused portion 272 may have a curvature/radius that is greater than the curvature/radius of the first radiused portion 172, and the second radiused portion 274 may have a curvature/radius that is greater than the curvature/radius of the second radiused portion 174. In another example, referring to FIG. 16, the lock lever can be a lock lever 318, similar to lock lever 118 and 218, that has a cam profile 370 with first and second radiused portions 372, 374. In this example, the first radiused portion 372 may have a curvature/radius that is greater than the curvature/radius of the first radiused portions 172 and 272, and the second radiused portion 374 may have a curvature/radius that is greater than the curvature/radius of the second radiused portions 174, 274.

As discussed herein, the tool 100 is a manual split beam type torque wrench. However, the tool 100 can be any electrically powered or hand-held tool, including, without limitation, a ratchet wrench, screwdriver, or other tool that is powered by electricity via a power source (such as a wall outlet and/or generator outlet) or a battery.

While the lock lever 118 is described as incorporated into a manual split beam type torque wrench, it should be appreciated that the lock lever 118 (including the cam profile) can be incorporated into any type of tool, where locking of a user manipulatable component is desired.

As used herein, the term "coupled" and its functional equivalents are not intended to necessarily be limited to direct, mechanical coupling of two or more components. Instead, the term "coupled" and its functional equivalents are intended to mean any direct or indirect mechanical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A torque wrench, comprising:

a head portion adapted to engage a fastener;

a handle portion coupled to the head portion and including an exterior surface with an aperture;

an adjustment knob having a shaft extending into the handle portion, wherein the adjustment knob is adapted to be operated by a user to set a torque setting of the torque wrench;

a lock lever selectively movable between locked and unlocked positions and including a bottom surface that is substantially flat and a rounded corner extending from the bottom surface and that forms a cam profile that is adapted to contact and cam against the exterior surface when the lock lever is moved between the locked and unlocked positions, wherein the cam profile includes a first radiused portion with a first radius proximal to the bottom surface and adapted to be disposed proximal to the exterior surface when the lock lever is disposed in the locked position, and a second radiused portion with a second radius greater than the first radius and adapted to be disposed proximal to the exterior surface when the lock lever is disposed in the unlocked position;

a pivot pin coupled to the lock lever and disposed off-center with respect to the cam profile; and a bias member having first and second ends, wherein the first end is disposed in the handle portion and engages the shaft, and the second end extends through the aperture and engages the pivot pin, wherein when the lock lever is in the locked position, the lock lever at least partially covers a portion of the adjustment knob, the second end is disposed a first distance away from the exterior surface, and causes the bias member to have a potential energy and apply a first bias force to the shaft to cause the adjustment knob to be retained in position by frictional engagement with the exterior surface.

2. The torque wrench of claim 1, wherein the first radius is about 0.08 inches to about 0.18 inches.

3. The torque wrench of claim 2, wherein the first radius is about 0.1 inches to about 0.12 inches.

4. The torque wrench of claim 1, wherein the first distance is about 0.2 inches to about 0.35 inches.

5. The torque wrench of claim 4, wherein the first distance is about 0.273 inches.

6. The torque wrench of claim 1, wherein when the lock lever is in the locked position, the pivot pin causes a second bias force to be exerted on the second end.

7. The torque wrench of claim 6, wherein the second bias force is about 92 lbs.

8. The torque wrench of claim 7, wherein the potential energy is about 12.6 lb-in.

9. A lock lever for a torque wrench, wherein the lock lever is selectively movable between a locked position that restricts movement of an adjustment knob and an unlocked position that allows movement of the adjustment knob, the lock lever comprising: a bottom surface that is substantially flat and a rounded corner extending from the bottom surface and that forms a cam profile that is adapted to contact and cam against a housing portion of the torque wrench when the lock lever is moved between the locked and unlocked positions, wherein the cam profile includes a first radiused portion with a first radius proximal to the bottom surface and adapted to be disposed proximal to the housing portion when the lock lever is disposed in the locked position, and a second radiused portion with a second radius greater than the first radius and adapted to be disposed proximal to the housing portion when the lock lever is disposed in the unlocked position; and a pivot pin that is off-center with respect to the cam profile.

10. The lock lever of claim 9, wherein a center of the pivot pin is disposed a first distance of about 0.17 inches to about 0.23 inches from a bottom surface of the lock lever.

11. The lock lever of claim 10, wherein the first distance is about 0.21 inches.

12. The lock lever of claim 9, wherein the first radius is about 0.08 inches to about 0.18 inches.

13. The lock lever of claim 9, wherein the second radius is about 0.15 inches to about 0.2 inches.

14. The torque wrench of claim 1, wherein the first radiused portion is adapted to contact and cam against the exterior surface when the lock lever is angularly disposed about 40 degrees from the locked position.

15. The lock lever of claim 9, wherein the first radiused portion is adapted to contact and cam against the housing portion when the lock lever is angularly disposed about 40 degrees from the locked position.

16. A lock lever for a tool, wherein the lock lever is selectively movable between locked and unlocked positions, the lock lever comprising:

a bottom surface that is substantially flat and a rounded corn er extending from the bottom surface and that forms a cam profile having a decreasing radiused portion adapted to contact and cam against a housing portion of the tool when the lock lever is moved between the locked and unlocked positions, wherein the decreasing radiused portion includes a first radiused portion with a first radius proximal to the bottom surface and that is adapted to be disposed proximal to an exterior of the tool when the lock lever is disposed in the locked position, and a second radiused portion with a second radius greater than the first radius and that is adapted to be disposed proximal to the exterior of the tool when the lock lever is disposed in the unlocked position.

17. The lock lever of claim 16, wherein the first radius is about 0.08 inches to about 0.18 inches.

18. The lock lever of claim 17, wherein the first radius is about 0.1 inches to about 0.12 inches.

19. The lock lever of claim 16, wherein the second radius is about 0.15 inches to about 0.2 inches.

20. The lock lever of claim 19, wherein the second radius is about 0.18 inches.

* * * * *